W. D. VALENTINE.
ELECTRIC MOTOR WHEEL.
APPLICATION FILED JULY 7, 1909.

1,151,741.

Patented Aug. 31, 1915.
3 SHEETS—SHEET 1.

WITNESSES:
G. B. Prindle
M. Meikle.

INVENTOR
Walter D. Valentine,
BY
Prindle and Wright
ATTORNEYS

W. D. VALENTINE.
ELECTRIC MOTOR WHEEL.
APPLICATION FILED JULY 7, 1909.

1,151,741.

Patented Aug. 31, 1915.
3 SHEETS—SHEET 2.

WITNESSES:

INVENTOR
Walter D. Valentine,
BY Prindle and Bright
ATTORNEYS.

W. D. VALENTINE.
ELECTRIC MOTOR WHEEL.
APPLICATION FILED JULY 7, 1909.

1,151,741.

Patented Aug. 31, 1915.
3 SHEETS—SHEET 3.

WITNESSES:
G. B. Prindle
M. Meikle

INVENTOR
Walter D. Valentine,
BY Prindle and Bright,
ATTORNEYS.

UNITED STATES PATENT OFFICE.

WALTER D. VALENTINE, OF ALTADENA, CALIFORNIA, ASSIGNOR TO NATIONAL RAPID TRANSIT COMPANY, OF NEW YORK, N. Y., A CORPORATION OF WASHINGTON.

ELECTRIC-MOTOR WHEEL.

1,151,741.  Specification of Letters Patent.  Patented Aug. 31, 1915.

Application filed July 7, 1909. Serial No. 506,388.

*To all whom it may concern:*

Be it known that I, WALTER D. VALENTINE, of Altadena, in the county of Los Angeles, and in the State of California, have invented a certain new and useful Improvement in Electric-Motor Wheels, and do hereby declare that the following is a full, clear, and exact description thereof.

The object of my invention has been to provide an electric motor wheel, and connections therefor, which, while adapted for other purposes, shall be especially adapted for use with monorail electric railways; and to such ends my invention consists in the electric motor wheel and connections therefor hereinafter specified.

That embodiment of my invention which I have chosen for illustration is shown in the accompanying drawings, in which—

Figure 1:
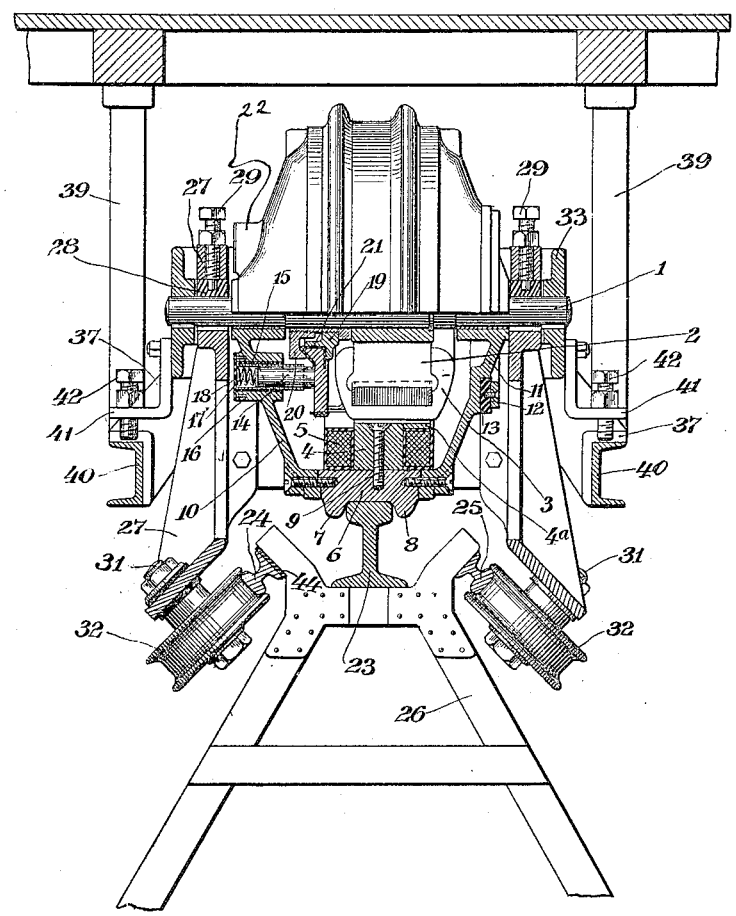
Figure 2:
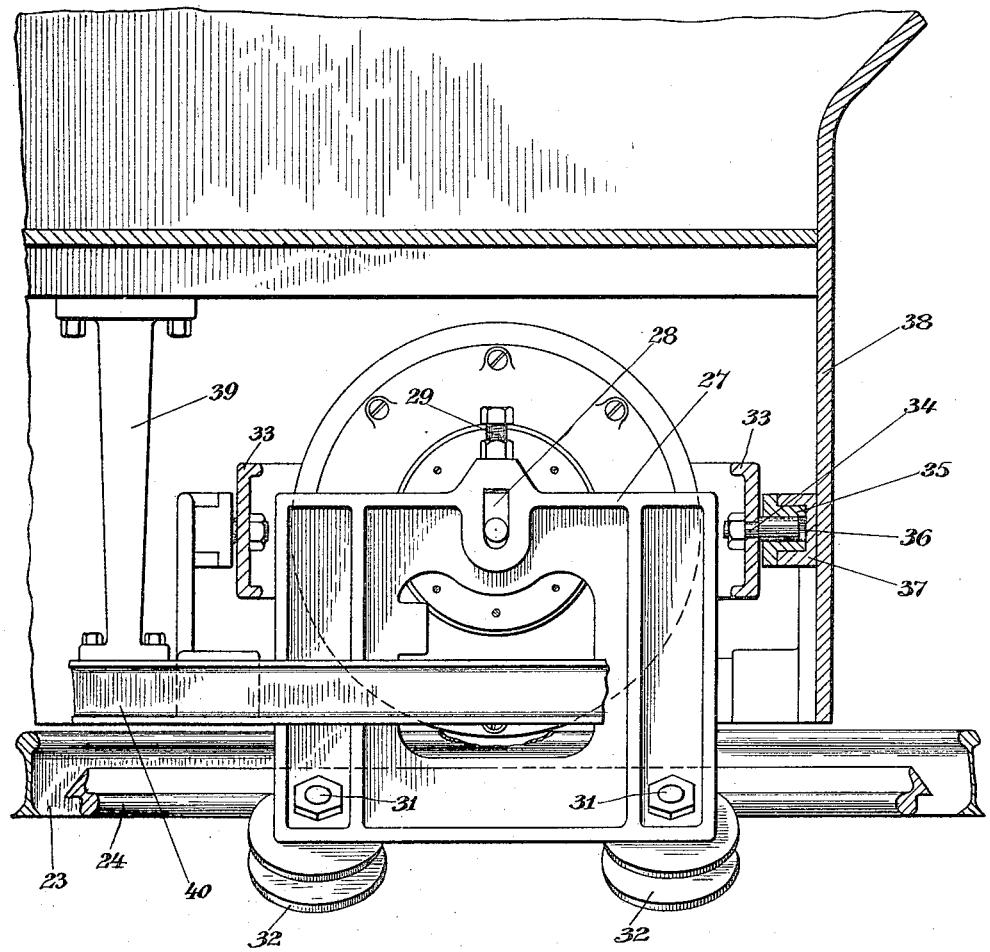
Figure 3:
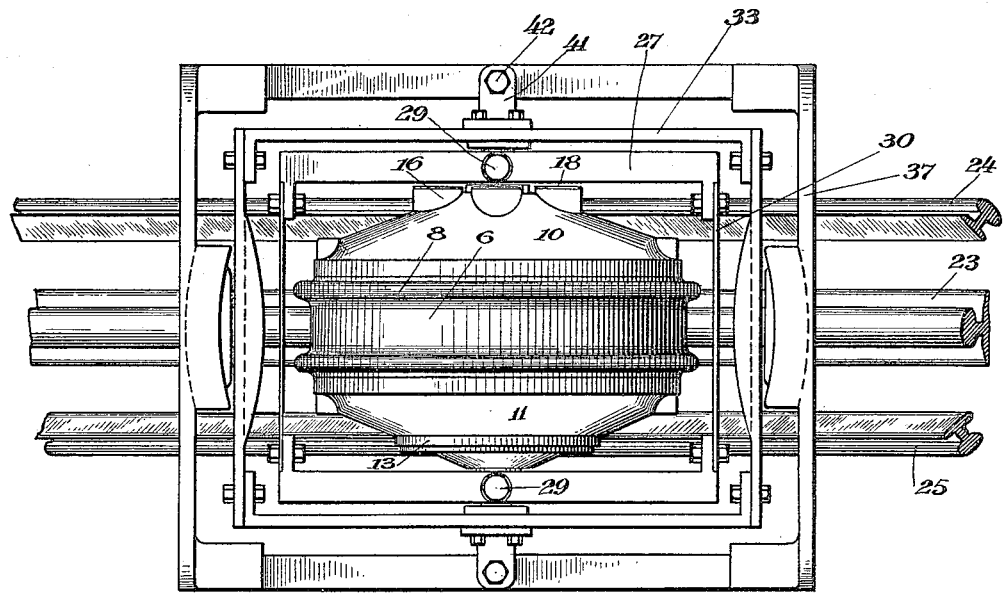
Figure 4:
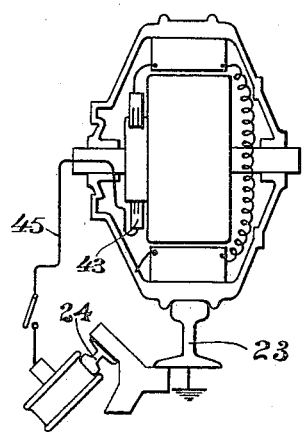

Figure 1 is a vertical sectional view of an electric motor wheel and truck frame therefor embodying my invention; Fig. 2 is a side elevation taken from the right in Fig. 1; Fig. 3 is a plan view; Fig. 4 is a diagrammatic view of the same showing the circuit arrangement.

Stated more fully, the object of my invention is to provide an electric motor wheel and connections therefor for monorail systems, which shall be of the utmost simplicity. Ordinarily, the inner member of an electric motor is the rotating member, and when this is the case, it is impossible to place such inner member in the plane of the rail of the monorail system without the employment of gearing for driving the wheel rim from said rotating member. According to my invention, I make the inner member stationary, and rotate the outer member of the motor, and I am thereby enabled to fasten the rim of the wheel directly to said outer member and avoid all intermediate gearing.

The details of my invention provide for strength, simplicity and compactness.

In the illustrated embodiment of my invention, a shaft 1 is rigidly supported in the framework of the truck. An armature 2 is keyed or otherwise rigidly secured to said shaft, said armature being provided with coils 3. The field core, which in this instance constitutes the rotor, consists of a ring 4, which may be made in sections, if desired, upon which are mounted the field coils 5. The ring is secured to the inner face of a rim or tire 6, the rim or tire preferably having two flanges 7 and 8, respectively, between which the rail is received. The field core 4 may be secured to the rim, as by screws 9. The construction which I have illustrated permits the use of the necessary soft metal for the field, and the harder metal for the wheel rim. The wheel rim is supported from the shaft 1 by spiders 10 and 11, respectively, which are secured to the sides of the rim as by screws. The spiders are provided with bushings so that they can be turned upon the shaft without wear. The spider 11 is provided with a slip ring 12, which is mounted upon an insulating base 13, the slip ring being connected with one of the field coils, the field coils being connected in series. The last field coil of the series is connected with a brush 14 which is mounted in an insulating bushing 15 that is mounted in a socket 16 formed in the spider 10. The said brush is forced toward a commutator, about to be described, by a spring 17 that is held to its work as by an insulating cap 18 secured in the said socket. The said commutator consists of an annular series of bars insulated from each other and clamped between a ring 19 that is keyed or otherwise secured to the shaft, and a ring 20 that is threaded upon the shaft or a bushing thereon, insulating material 21 being interposed between the commutator bars and the said rings. Each bar is, as usual, connected with a coil of the armature, the coils being preferably connected in series, although the form of armature winding is entirely unimportant. A similar brush is at 22 diametrically opposite to the brush 14 and similarly mounted. This brush 22 is connected with the rim or tire 6. In order to balance the weight over the rim, I shift the armature and commutator so that the center of gravity of the two shall be over the supporting rail, and extend the pole pieces 4ᵃ laterally so that they shall be opposite the armature. The field coils 5 are shifted as far as the rim will permit to balance the weight, and the armature and commutator are shifted still farther to completely balance the apparatus.

The form of truck illustrated in the drawings, by which a car may be supported from and driven by my motor wheel, is adapted to run upon an elevated track having a central rail 23, and lateral steadying rails 24 and 25, respectively. These rails are supported upon an elevated structure 26 of any desired construction, and the truck frame is provided with suitable wheels for engaging them. In the truck frame, the axle supports side frames 27 by engagement with blocks 28 which rest upon the axles and which support adjustable screws 29 threaded in the side frames. The side frames 27 are connected by plates 30, thus forming a frame rectangular, when seen from above. The side frames carry at their lower ends studs 31, upon which are journaled wheels 32 which bear upon the rails 24, 25. The rectangular frame, formed by the side frames 27 and the plates 30, is surrounded by another rectangular frame 33 which has holes in its side bars, in which the ends of the shaft are received and keyed to prevent turning. The end bars of the frame 33 carry pins 34, upon which are swiveled blocks 35, the latter being received in slideways 36 formed horizontally in cross bars 37, which latter support the car. The cross bars 37 are secured to uprights 38 and 39, respectively, which support the car at their upper ends. These uprights are connected by horizontal beams 40. The frame 33 is provided with a bracket 41 on each side, in which is threaded a vertical screw 42, the points of the screws being adapted to bear upon the beams 40. A brush 43 is mounted in an insulating socket in one of the side frames 27, said brush being adapted to bear on the slip ring 12. The rail 24 is insulated, by non-conductive material 44, from the supporting structure 26, and the stud 31 is insulated from the side frame 27. The stud 31 is connected by a lead 45 with the brush 43, before referred to.

In the operation of my driving apparatus, the two branches of the generator circuit are connected respectively with the rails 23 and 24. Current passes by the rail 24 to the wheel 32, and thence to the stud 31, and by the lead 45 to the brush 43, thence to the slip ring 12—through the field coils and to the brush 14. From the said brush it passes through the commutator and the armature coils to the brush 22, and by means of the appropriate lead to the rim or tire 6.

In rounding a curve, the driving wheel and the guiding wheels 32 are permitted to turn in a horizontal plane, relative to the car body, by means of a sliding connection formed by the blocks 35 and the slideway 36. Tipping of the car relative to a vertical plane is permitted within the limits determined by the screws 42, by means of the swiveled connection between the pins 34 and the blocks 35.

It will be observed that my motor wheel is one of great simplicity, involving no gearing whatever in transmitting motion from the rotor of the motor to the rim or tire. The structure consists simply of two relatively rotatable parts.

It is obvious that various changes can be made in the above-illustrated embodiment of my motor wheel, which will be within the scope of my invention, and I desire that my claims be not limited beyond the requirements of the prior art and their necessary intendment.

I claim:

1. An electric motor wheel, comprising a rim or tire, a field magnet directly secured to the inside of said rim and displaced laterally relative to the rim, symmetrical side frame secured to said rim, a shaft supported in said side frames, an armature and a commutator side by side on said shaft, the armature and commutator being displaced laterally relative to said field, so as to substantially balance the weight of said armature and commutator in a plane passing through the center of tread of said rim.

2. An electric motor wheel comprising a rim, a rotor directly attached thereto and laterally displaced with regard to the rim, side frames secured to said rim, a shaft supported in the side frames, a stator on said shaft, the stator being displaced laterally relative to said rotor so as to substantially balance the weight of said rotor and stator in a plane passing through the center of the tread of the rim.

In testimony that I claim the foregoing I have hereunto set my hand.

WALTER D. VALENTINE.

Witnesses:
 EDWIN J. PRINDLE,
 A. NEWCOMB.

Copies of this patent may be obtained for five cents each, by addressing the "Commissioner of Patents. Washington, D. C."